No. 815,161. PATENTED MAR. 13, 1906.
F. D. HALL.
CUTTER HEAD.
APPLICATION FILED MAY 1, 1905.
3 SHEETS—SHEET 2.
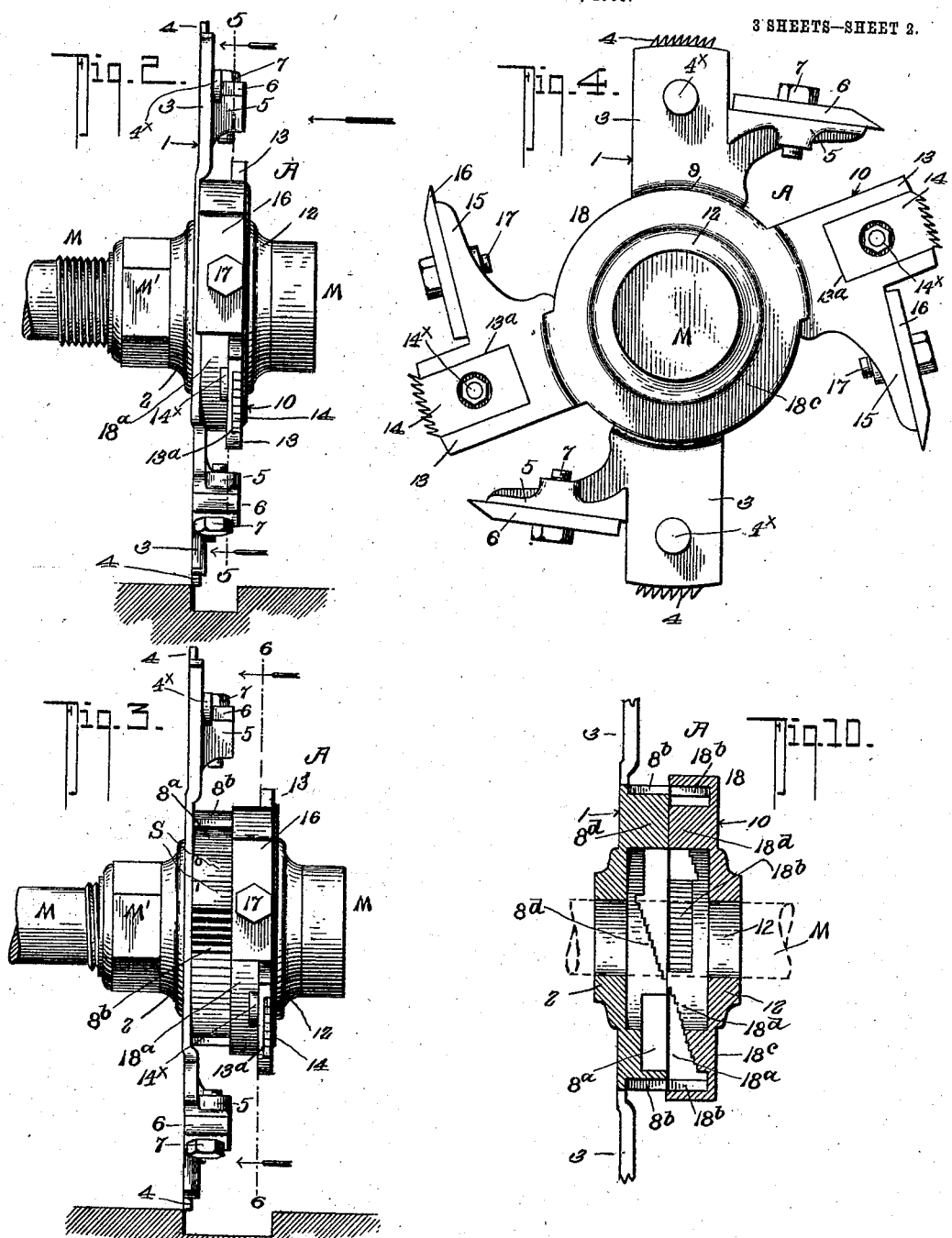
WITNESSES:
O. W. Holmes
F. C. Gibson.
INVENTOR.
Frank D. Hall,
BY
Fred G. Dieterich & Co.
ATTORNEYS

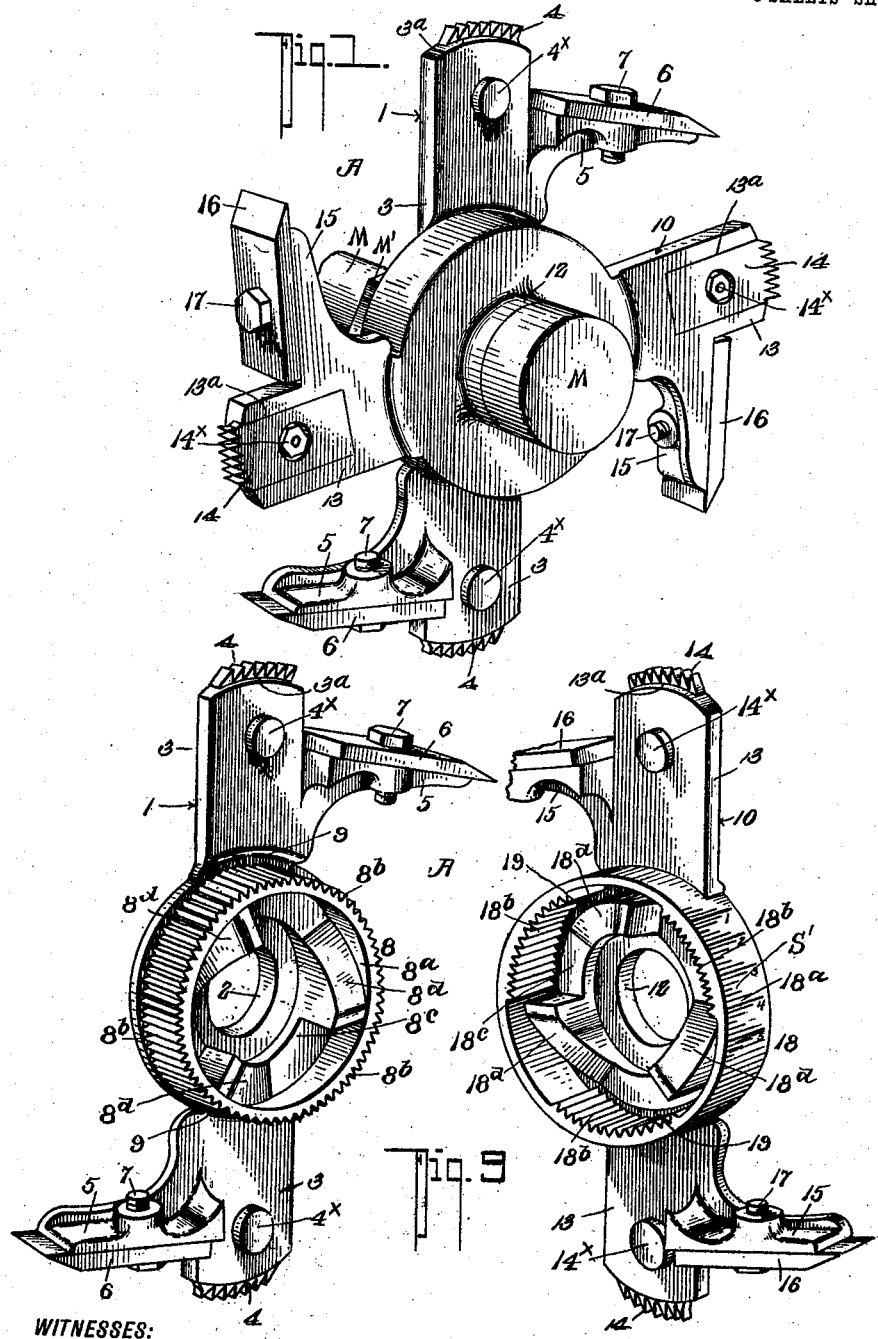

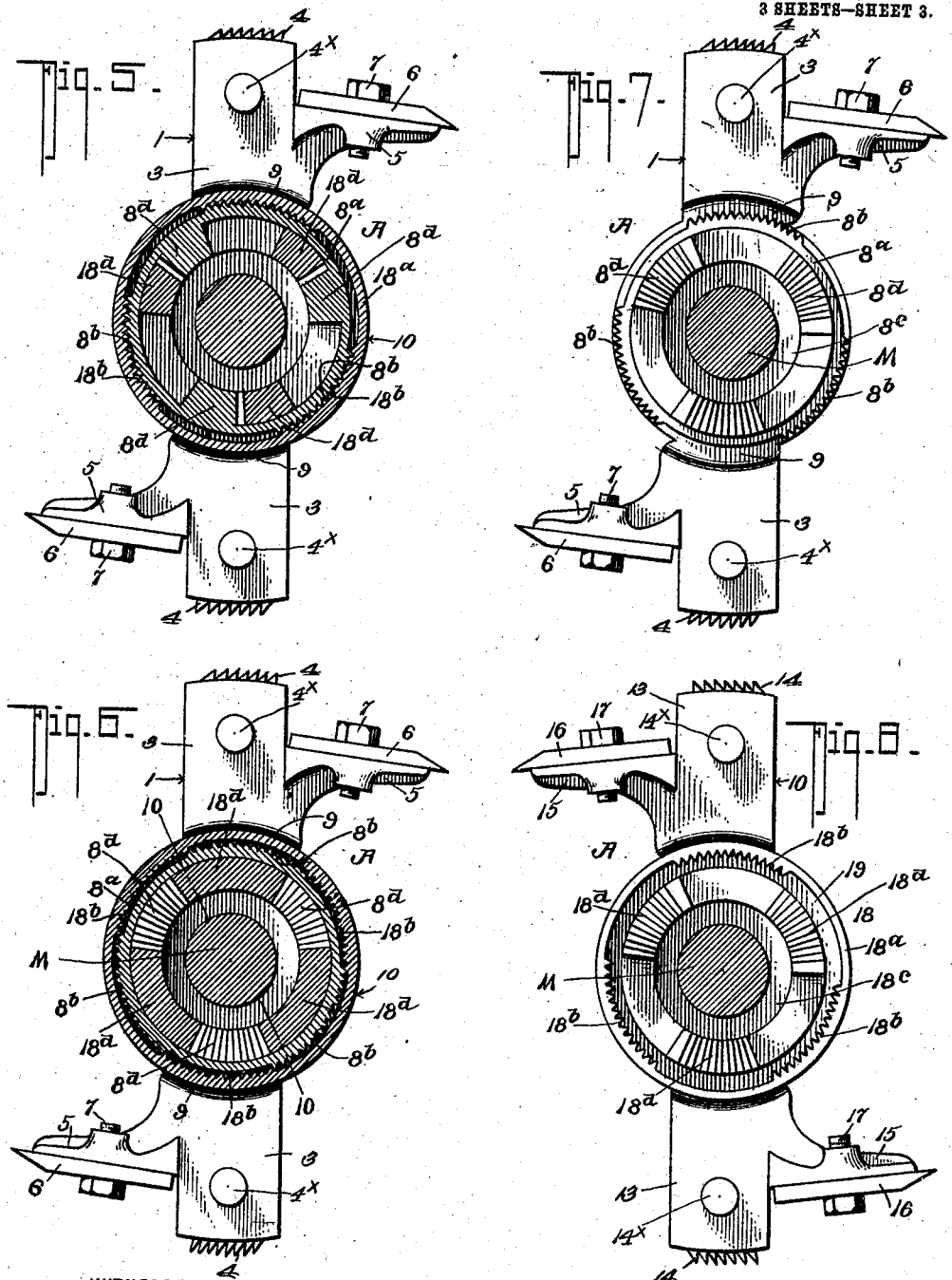

UNITED STATES PATENT OFFICE.

FRANK D. HALL, OF WAUKEGAN, ILLINOIS.

CUTTER-HEAD.

No. 815,161.     Specification of Letters Patent.     Patented March 13, 1906.

Application filed May 1, 1905. Serial No. 258,332.

*To all whom it may concern:*

Be it known that I, FRANK D. HALL, residing at Waukegan, in the county of Lake and State of Illinois, have invented certain new and useful Improvements in Cutter-Heads, of which the following is a specification.

My invention relates to certain new and useful improvements in cutter-heads, and it more particularly seeks to provide a cutter-head of the class known in the art as "dado" cutter-heads, and it particularly seeks to provide a cutter-head of this character of a very simple and compact construction, which can be readily and accurately adjusted to cut grooves of different widths ranging from a width equal to that of one of the main cutters to a groove equal in width to twice the width of said cutters.

In its generic nature my invention includes a two-part cutter-head, each of which parts is provided with spacing and interlocking devices so arranged that when the two parts are superimposed on each other by simply turning the parts on the mandrel the parts can be separated or brought together to shift the cutters into proper correlative arrangement to cut grooves of the desired size.

In its more specific nature my invention comprises a two-part cutter-head, each part of which is provided with a hub portion adapted to be received by the mandrel, which hub portions have their adjacent faces provided with stepped inclines, the inclines of the one part adapted to interlock with those of the other part to adjust the parts toward or from each other and each of said cutter-head parts being provided with interlocking rack portions to rigidly hold the parts in their adjusted positions.

With other objects in view than have heretofore been enumerated the invention also comprises certain novel construction, combination, and arrangement of parts, all of which will be first described in detail and then specifically pointed out in the appended claims, reference being had to the accompanying drawings, in which—

Figure 1 is a perspective view of my invention. Fig. 2 is a side elevation thereof, showing the parts adjusted for cutting the narrow-width groove. Fig. 3 is a similar view showing the parts adjusted for cutting a groove of the greatest width. Fig. 4 is an end elevation of the parts shown in Fig. 2 looking in the direction of the arrow. Fig. 5 is a cross-section on the line 5 5 of Fig. 2. Fig. 6 is a similar view on the line 6 6 of Fig. 3. Fig. 7 is an end face view of one section of the cutter-head, showing the stepped inclines and the rack-teeth. Fig. 8 is a similar view of the other section of the cutter-head, showing the stepped inclines and rack portions thereof. Fig. 9 is a detail perspective view of a slightly-modified form of cutter-head, the parts being separated to show the interior construction thereof, and in this form the inclines are plain and not stepped. Fig. 10 is a detail diagrammatic view on the line 10 10 of Fig. 6.

Referring now to the accompanying drawings, in which like letters and numerals of reference indicate like parts in all of the figures, A designates the cutter-head, which comprises sections 1 and 10, each of which consists of a central hub portion 2 and 12, respectively, and each of which is provided with radial arms 3 3 and 13 13, respectively, those on each section being arranged diametrically opposite to one another. The arms 3 3 and 13 13 are each provided on their outer face with recesses $3^a$ $3^a$ and $13^a$ $13^a$, respectively, to receive the side cutters 4 4 and 14 14 of the sections 1 and 10, respectively. The cutters 4 4 and 14 14 are held in place by the screws or bolts $4^\times$ $4^\times$ and $14^\times$ $14^\times$, as shown. The arms 3 3 and 13 13 are provided with brackets 5 5 and 15 15, respectively, to which the cutter-knives 6 6 and 16 16, respectively, are secured by the screws or bolts 7 7 and 17 17.

The section 1 is provided with a central housing 8, having a rim $8^a$, provided on its outer face with racks or teeth $8^b$ $8^b$, which may be extended entirely around the rim, as shown in Fig. 9, but which are preferably arranged in three groups separated by spaces, as clearly shown in the form disclosed in Figs. 1, 2, and 3.

Within the housing 8 adjacent the rim $8^a$ and on the back wall $8^c$ thereof is a plurality of stepped inclined portions $8^d$ $8^d$, which are diagrammatically shown in Fig. 10. The inclines $8^d$ $8^d$ are preferably three in number and arranged one hundred and twenty degrees apart around the axial line of the cutter-head.

9 9 designate grooves between the rim $8^a$ of the housing 8 and the body portion of the arms 3 3 for a purpose presently understood.

The section 10 includes a central housing 18, having a rim 18ª of greater diameter than the rim 8ª of the section 1, which rim 18ª of the section 10 is provided on its inner face with racks or teeth 18ᵇ 18ᵇ for coöperating with the racks or teeth 8ᵇ 8ᵇ of the section 1, and the teeth 18ᵇ 18ᵇ of the section 10 may be extended entirely around the rim or they may be arranged in three or more groups to correspond with the arrangement of the teeth on the rim 8ª of the section 1. When the teeth are arranged in groups of threes, each group is preferably disposed one hundred and twenty degrees around the axial line of the cutter-head. When the teeth on the rim 8ª of the section 1 extend entirely around the same, I may also extend the teeth 18ᵇ 18ᵇ on the rim 18ª of the section 10 entirely around the same, if desired.

Within the housing 18 of the section 10 and stepped from the rim 18ª and arranged on the back wall 18ᶜ of the housing 18 are a plurality of stepped inclined portions 18ᵈ 18ᵈ of similar construction to the stepped inclined portions 8ᵈ 8ᵈ of the section 1, and the said inclines 18ᵈ 18ᵈ are arranged oppositely to and coöperate with the inclines 8ᵈ 8ᵈ of the section 1. The inclines 18ᵈ 18ᵈ of the section 10 are also preferably three in number and arranged one hundred and twenty degrees apart, the same as the inclines 8ᵈ 8ᵈ of the section 1.

19 19 designate a space or groove between the rim 18ª of the housing 18 of the section 10 and the stepped inclines 18ᵈ 18ᵈ thereof, which groove or space 19 is designed to receive the rim 8ª of the housing 8 in a manner clearly understood by reference to the drawings, the rim 18ª of the housing 18 of the section 10ª passing into the grooves 9 9 of the section 1, as shown.

In Fig. 9 I have shown a slightly-modified form of my invention in which the inclines 8ᵈ and 18ᵈ of the sections 1 and 10, respectively, have their engaging faces of plain surface, the adjustments being made by means of the teeth on the rims alone.

So far as described the manner in which my invention operates will be best explained as follows: The sections are superimposed upon one another in the manner shown in Figs. 1 and 2, they being securely held on the mandrel M by the nuts M' M', as shown. When the parts are in the position shown in Figs. 1 and 2, they are as close together as it is possible to bring the same and will therefore cut a groove equal in width to the width of one cutter-knife. To cut grooves of greater width than the width of one cutter-knife, it is only necessary to loosen one of the nuts M' on the mandrel or arbor and pull the two sections apart, turning the same with respect to each other the desired distance to cause the stepped inclines to assume a relation with respect to one another which will hold the sections separated the desired distance, as shown in Fig. 3 and as shown in dotted lines diagrammatically in Fig. 10. The nut M' is then tightened and the parts will be held in position, it being understood that the rack-teeth will prevent the two sections from turning on their axis, and hence prevent them from coming together when once set.

I may use the rack-teeth with smooth or plain surface inclines or I may use the same with stepped-surface inclines, as may be found desirable.

To aid in adjusting the parts to their proper width, the outside of the rims of the two sections may be provided with scale-marks S S', as shown.

From the foregoing it will be seen that I have provided a very simple and effective construction of dado-cutter in which the parts can be readily adjusted to cut grooves of any width ranging from the width of a single cutter-knife to twice the width of a single cutter-knife and in which the parts are so arranged that there are no washers, screws, bolts, or nuts on the respective head-sections to become loose or which need to be manipulated in adjusting the parts.

By providing the rims with interlocking rack-teeth, as shown, should either of the nuts M' become slightly loosened the respective parts of the cutter-heads will not change their relative positions or slip around their axis to separate the cutters from one another.

While I have shown and described my invention as particularly adapted for use as a dado cutter-head, yet I desire it understood that the same may be used in connection with any cutter-head of similar construction and used for any purpose that may be found desirable.

From the foregoing description, taken in connection with the accompanying drawings, it is thought the complete construction, operation, and many advantages of my invention will be readily apparent to those skilled in the art to which it appertains.

Having thus described my invention, what I claim, and desire to secure by Letters Patent, is—

1. A cutter-head of the class described, comprising two sections, each having radial arms to receive the cutters, means formed integrally with each section for holding said sections at a greater or less distance apart upon rotation of the sections respectively to gage the adjustment of the same along the axial line of the cutter-head, the means of one section interfitting and coöperating with the means of the other section, substantially as shown and described.

2. A dado cutter-head comprising a pair of sections, each having a body portion provided with inclines on the adjacent end faces of the sections, the inclines of one section adapted to coöperate with those of the other section to adjust the sections along the axial line of the cutter-head and means for holding the sections in their adjusted positions.

3. A cutter-head comprising a spindle, a pair of sections, each having a body portion provided with a bearing for receiving said spindle, each section body portion being provided with integrally-formed means for determining or regulating the degree of proximity of said sections, upon the rotation of the sections respectively, to gage the adjustment of the same toward or from each other along the spindle, said last-named means of one section adapted to coöperate with the corresponding means of the other section and means for locking the sections together.

4. A cutter-head comprising a spindle, a pair of sections, each having a body portion provided with a bearing for receiving said spindle, each section body portion being provided with integrally-formed means for determining, upon the rotation of the sections respectively, the degree of proximity of said sections, to gage the adjustment of the sections toward or from each other along the spindle, said determining means of one section adapted to coöperate with the determining means of the other section and means for locking the sections together, said determining means being formed independent of the spindle and having no direct connection therewith.

5. A dado cutter-head comprising a pair of sections each having a body portion provided with inclines arranged in planes crossing the plane of rotation of the cutter-head, the inclines of one section adapted to coöperate with those of the other section, each section having rack-teeth, the rack-teeth of one section adapted to interlock with those of the other section to hold the sections in their adjusted positions, substantially as shown and described.

6. A dado-cutter comprising a pair of sections each having a body portion provided with stepped inclines arranged in planes crossing the plane of rotation of the cutter-head, the inclines of one section adapted to be engaged by the inclines of the other section to hold the sections spaced apart, substantially as shown and described.

7. A dado-cutter comprising a pair of sections each having a body portion provided with stepped inclines arranged in planes crossing the plane of rotation of the cutter, the inclines of one section adapted to be engaged by the inclines of the other section to hold the sections spaced apart, and means for locking the sections to their adjusted positions, substantially as shown and described.

8. A dado cutter-head comprising a pair of sections each having a body portion provided with stepped inclines arranged in planes crossing the plane of rotation of the cutter, the inclines of one section adapted to be engaged by those of the other section, each section having rack portions, the rack portions of one section adapted to interlock with those of the other sections to hold the sections to their adjusted positions, substantially as shown and described.

9. A cutter of the character described, comprising a pair of sections each having a cylindrical body portion, a plurality of inclines within each cylindrical body portion arranged in planes crossing the plane of rotation of the cutter, the inclines of one section adapted to be engaged by those of the other section, the cylindrical wall of one section adapted to enter that of the other section, and means on each cylindrical wall to interlock the two sections, substantially as shown and described.

10. A cutter of the character described, comprising a pair of sections each having a cylindrical body portion, a plurality of inclines within each cylindrical body portion arranged in planes crossing the plane of rotation of the cutter, the inclines of one section adapted to be engaged by those of the other section, the cylindrical wall of one section adapted to enter that of the other section, means on each cylindrical wall to interlock the two sections, said means comprising rack-teeth, substantially as shown and described.

11. A dado-cutter comprising a pair of sections each consisting of a cylindrical body portion and a pair of radial arms, said radial arms having cut-away portions, cutters held in said cut-away portions, each of said radial arms having an extension, cutter-knives secured to said extensions, each of said sections having inclines within the cylindrical body portion arranged in planes crossing the plane of rotation of the cutter, the inclines of one section adapted to coöperate with those of the other section to space the sections apart, and means on the peripheral portion of each cylindrical body portion for interlocking the sections to hold them in their adjusted positions, substantially as shown and described.

12. A dado-cutter comprising a pair of sections each consisting of a cylindrical body portion and a pair of radial arms, said radial arms having cut-away portions, cutters held in said cut-away portions, each of said radial arms having an extension, cutter-knives secured to said extensions, each of said sections having inclines within the cylindrical body portion arranged in planes crossing the plane of rotation of the cutter, the inclines of one section adapted to coöperate with those of the other sections to space the sections apart, the peripheral portions of the cylindrical body portions of each section being provided with interlocking teeth, substantially as shown and described.

13. A dado-cutter comprising a pair of sections each consisting of a cylindrical body portion and a pair of radial arms, said radial arms having cut-away portions, cutters held in said cut-away portions, each of said radial arms having an extension, cutter-knives secured to said extensions, each of said sections having inclines within the cylindrical body portion arranged in planes crossing the plane of rotation of the cutter, the inclines of one section adapted to coöperate with those of the other sections to space the sections apart, the peripheral portions of the cylindrical body portions of each section being provided with interlocking teeth, the cylindrical body portion of one section adapted to telescopically enter the cylindrical body portion of the other section, substantially as shown and described.

14. A dado-cutter comprising a pair of sections each consisting of a cylindrical body portion and a pair of radial arms, said radial arms having cut-away portions, cutters held in said cut-away portions, each of said radial arms having an extension, cutter-knives secured to said extensions, each of said sections having inclines within the cylindrical body portion arranged in planes crossing the plane of rotation of the cutter, the inclines of one section adapted to coöperate with those of the other sections to space the sections apart, the peripheral portions of the cylindrical body portions of each section being provided with interlocking teeth, the cylindrical body portion of one section adapted to telescopically enter the cylindrical body portion of the other section, and scale-marks on said sections for determining their adjustments substantially as shown and described.

15. A cutter-head of the character stated comprising two sections each having radial arms to receive the cutters, each section being provided with integrally formed inclined portions lying in planes crossing the plane of rotation of the cutter-head, the inclined portions of one section adapted to engage those of the other section, means for interlocking the two sections, and means for indicating the adjustments of the sections, substantially as shown and described.

16. A cutter-head of the character stated comprising two sections, stepped inclines on the adjacent portions of the sections, said inclines adapted to coöperate with one another to hold the sections at various distances from each other along the axial line of the cutter-head, means carried by the sections for interlocking them and means carried by the sections for indicating their adjustments, substantially as shown and described.

FRANK D. HALL.

Witnesses:
ROBERT J. ERSKINE,
C. H. ALBRECHT.